US012562534B2

(12) United States Patent
Schafmeister et al.

(10) Patent No.: US 12,562,534 B2
(45) Date of Patent: Feb. 24, 2026

(54) ELECTRICAL PLUG CONNECTOR WITH SHIELD PLATE AND GUIDE ELEMENT

(71) Applicants: PHOENIX CONTACT GmbH & Co. KG, Blomberg (DE); ept GmbH, Peiting (DE)

(72) Inventors: Arndt Schafmeister, Dorentrup (DE); Nico Wassel, Blomberg (DE); Alexander Herbst, Blomberg (DE); Kathrin Stelzer, Paderborn (DE); Dimitri Hardt, Paderborn (DE); Ralf Geske, Schieder-Schwalenber (DE); Markus Sonderer, Höxter (DE); Sven Hergesell, Hameln (DE); Ralph Habiger, Hohenfurch (DE); Georg Brennauer, Wildsteig (DE); Helge Fritsch, Peiting (DE); Stefan Frommrich, Schongau (DE); Ralf Gehle, Detmold (DE)

(73) Assignees: PHOENIX CONTACT GmbH & Co. KG, Blomberg (DE); ept GmbH, Peiting (DE)

( * ) Notice: Subject to any disclaimer, the term of this patent is extended or adjusted under 35 U.S.C. 154(b) by 278 days.

(21) Appl. No.: 17/291,968

(22) PCT Filed: Nov. 7, 2019

(86) PCT No.: PCT/EP2019/080493

§ 371 (c)(1),
(2) Date: May 6, 2021

(87) PCT Pub. No.: WO2020/094768

PCT Pub. Date: May 14, 2020

(65) Prior Publication Data

US 2021/0408737 A1 Dec. 30, 2021

(30) Foreign Application Priority Data

Nov. 7, 2018 (DE) ..................... 10 2018 127 814.4

(51) Int. Cl.
*H01R 13/6594* (2011.01)
*H01R 12/71* (2011.01)
(Continued)

(52) U.S. Cl.
CPC ....... *H01R 13/6594* (2013.01); *H01R 12/716* (2013.01); *H01R 13/6581* (2013.01);
(Continued)

(58) Field of Classification Search
CPC .............. H01R 13/6594; H01R 12/716; H01R 13/6581; H01R 13/658; H01R 13/6591; H01R 13/428
See application file for complete search history.

(56) References Cited

U.S. PATENT DOCUMENTS 6,623,301 B2 9/2003 Lappoehn
6,749,463 B1 * 6/2004 Fan ...................... H01R 13/658 439/607.23
(Continued)

FOREIGN PATENT DOCUMENTS

CN 103515798 A 1/2014
CN 108346939 A 7/2018
(Continued)

OTHER PUBLICATIONS

Indian Office Action for Indian Patent Application No. 202117020335 IN, equivalent of U.S. Appl. No. 17/291,968, "Plug Connector," 7 pages.
(Continued)

*Primary Examiner* — Justin M Kratt
(74) *Attorney, Agent, or Firm* — Lee & Hayes, P.C.

(57) ABSTRACT

A plug connector having a housing that includes at least one receptacle formed on the housing for securing a contact
(Continued)

which is designed to contact a contact of a further plug connector that includes at least one shield plate. The shield plate has at least one freely protruding soldering portion which passes through a housing opening, a free end portion of the soldering portion being bent away from the receptacle or being bent in the direction of the receptacle.

9 Claims, 6 Drawing Sheets

(51) Int. Cl.

| | |
|---|---|
| ***H01R 13/6581*** | (2011.01) |
| *H01R 13/428* | (2006.01) |
| *H01R 13/658* | (2011.01) |
| *H01R 13/6591* | (2011.01) |

(52) U.S. Cl.

CPC .......... *H01R 13/428* (2013.01); *H01R 13/658* (2013.01); *H01R 13/6591* (2013.01)

(56) References Cited

U.S. PATENT DOCUMENTS

| | | | | |
|---|---|---|---|---|
| 7,044,783 | B2 | 5/2006 | Fan | |
| 7,540,777 | B2 * | 6/2009 | Lappoehn .......... | H01R 13/6581 439/108 |
| 10,062,989 | B2 | 8/2018 | Little et al. | |
| 2002/0173201 | A1 * | 11/2002 | Lappoehn .......... | H01R 13/6581 439/607.36 |
| 2003/0107881 | A1 | 6/2003 | Muramatsu et al. | |
| 2004/0029410 | A1 * | 2/2004 | Akama ................ | H01R 12/716 439/65 |
| 2005/0095913 | A1 | 5/2005 | Fan | |
| 2009/0104797 | A1 * | 4/2009 | Tseng ................... | H05K 7/1069 439/76.1 |

FOREIGN PATENT DOCUMENTS

| | | | | |
|---|---|---|---|---|
| DE | 10119695 | | 4/2006 | |
| DE | 102005059990 | A1 | 6/2007 | |
| DE | 102005059990 | B4 | 3/2008 | |
| EP | 1251591 | A2 | 10/2002 | |
| JP | 2003179379 | A | 6/2003 | |
| JP | 2007165313 | A | 6/2007 | |
| JP | 2013164902 | A | 8/2013 | |
| TW | 201431209 | | 8/2014 | |
| WO | WO-03065512 | A1 * | 8/2003 | ........... H01R 12/716 |

OTHER PUBLICATIONS

Translation of International Search Report dated Dec. 13, 2020, from corresponding PCT Application No. PCT/EP2019/080493, 2 pages.

The Japanese Office Action for U.S. Appl. No. 17/291,968, mailed Jun. 9, 2022, 6 pages.

The Chinese Office Action for U.S. Appl. No. 17/291,968, mailed Jun. 15, 2022, 6 pages.

* cited by examiner

ELECTRICAL PLUG CONNECTOR WITH SHIELD PLATE AND GUIDE ELEMENT

CROSS-REFERENCE TO RELATED APPLICATIONS

This Application claims priority to and is national stage application, filed under 35 U.S.C. § 371, of International Patent Application No. PCT/EP2019/080493, filed Nov. 7, 2019, which claims priority to German Patent Application No. 10 2018 127 814.4, filed Nov. 7, 2018, both of which are incorporated herein by reference.

TECHNOLOGICAL FIELD

The present disclosure relates to a plug connector, comprising a housing, comprising at least one receptacle formed on the housing for securing a contact which is designed to contact a contact of a further plug connector, and comprising at least one shield plate which is held on the housing in order to shield the contact.

BACKGROUND

Plug connectors of the type mentioned at the outset are used for coupling to a further plug connector which forms a mating connector, in order to provide detachable electrical contacting between the contacts of the plug connectors. For example, the plug connector can be secured or soldered to a printed circuit board and, together with a wired mating connector, can form a detachable electrical plug connection. It is known to attach shield plates to plug connectors of this type, in order to dissipate interference currents and to not impair the electrical contacting inside the plug connector.

Known shield plates are often provided with at least two coatings in order to produce reliable solderability and achieve good contacting.

Known shield plates also have soldering feet arranged on the edges for soldering the shield plates.

SUMMARY

The technical problem addressed by the present invention is that of providing an improved plug connector.

The disclosure relates to a plug connector, comprising a housing, comprising at least one receptacle formed on the housing for securing a contact which is designed to contact a contact of a further plug connector, and comprising at least one shield plate which is held on the housing in particular in order to shield the contact to be received, the plug connector being characterized in that the shield plate comprises at least one freely protruding soldering portion which passes through a housing opening, a free end portion of the soldering portion being bent away from the receptacle or being bent in the direction of the receptacle.

Arranging the soldering portion within the housing opening makes it possible for the soldering portion to be arranged not only on the edges but also, for example, in a central region of the housing, in order to dissipate interference currents. Bending the free end portion of the soldering portion makes simplified production of the solder connection possible, for example by SMD soldering.

According to a further embodiment of the plug connector, three or more soldering portions are provided on the shield plate, which soldering portions each pass through an associated housing opening, an end portion of each of the three or more soldering portions being bent away from the receptacle or being bent in the direction of the receptacle, the soldering portions being arranged so as to be distributed equidistantly. Arranging the soldering portions equidistantly allows interference currents to be reliably and uniformly dissipated via the shield plate.

For example, the soldering portions, viewed over a width of the shield plate that is oriented transversely to an insertion direction, have soldering portions arranged equidistantly. In particular, precisely three soldering portions can be provided on the shield plate.

In order to provide the shield plate in a simple and cost-effective manner, the shield plate can consist of a single alloy and the shield plate can be uncoated. Accordingly, the shield plate in particular does not comprise a gold-plated contact region or tin-plated soldering region, but instead consists of a single alloy material.

It is understood that the alloy material can be a mixture of different metal materials. In particular, the metal alloy is: a copper-nickel-tin alloy or copper-nickel-zinc alloy.

According to a further embodiment of the plug connector, in order to simply and reliably secure the shield plate to the housing, the shield plate can comprise at least one latching hook by means of which the shield plate is held on the housing.

The latching hook can form-fittingly engage in a shaped element formed on the housing, in order to predefine a position of the latching hook for assembly.

According to a further embodiment of the plug connector, in order to predefine an insertion movement, the housing can comprise at least one guide element which is designed to form-fittingly guide and position the plug connector on a further plug connector, the guide element being spaced apart from the shield plate.

The guide element is in particular separate and spaced apart from the shield plate, so that guiding and positioning during the insertion movement is independent of the position and shape of the shield plate.

The guide element can be a projection or a mandrel, the projection or mandrel being designed to form-fittingly engage in a complementarily shaped guide element of the further plug connector, such as a groove, a recess or the like.

Alternatively, the guide element can be a groove or a recess, the groove or recess being designed to form-fittingly receive a complementarily shaped guide element of the further plug connector, such as a projection, a mandrel or the like.

According to a further embodiment of the plug connector, in order to provide the guide element in a simple and 20 cost-effective manner, the guide element can be an integral part of an outer wall of the housing, the outer wall circumferentially enclosing the receptacle. The receptacle can in this case be formed, for example, on a web region (inner web) of the housing that is enclosed by the outer wall, in order to hold 25 contacts there in a form-fitting and/or frictional manner.

Contacts of this type can comprise an electrically conductive material or consist of an electrically conductive material in order to form an electrically conductive connection to a further contact of this type of the further plug connector.

The housing can comprise an electrically insulating material or consist of an electrically insulating material.

At least two or precisely two guide elements can be provided.

In particular, the guide elements form a positioning means that predefines a rectilinear insertion movement of the plug connectors to be connected.

A first guide element can be formed on a first wall portion of the housing and a second guide element can be formed on a second wall portion of the housing, the first wall portion and the second wall portion being spaced apart from one another and arranged on opposite housing sides.

For example, the housing can have a cuboid basic shape, the guide elements being arranged on opposite housing sides such that the two-sided guidance can prevent tilting when a further plug connector is inserted into the plug connector.

Mechanical coding can be formed by means of the guide elements, which coding predefines an orientation when a further plug connector is inserted into the plug connector such that incorrect assembly can be avoided.

For example, the mechanical coding can be formed by an asymmetrical arrangement of the guide elements or by different dimensioning of the guide elements.

According to a further embodiment of the plug connector, in order to provide robust and reliable guidance, the guide element can have a height which is measured along an insertion direction of the further plug connector into the plug connector and which is more than half the total height of the housing.

Alternatively or in addition, the guide element can have a width which is measured perpendicularly to an insertion direction of the further plug connector into the plug connector and which is more than a quarter of the total width of the housing.

The further plug connector can also be formed in the manner according to the disclosure described above, and therefore both the plug connector and the further plug connector can be provided as plug connectors according to the disclosure. The plug connectors can thus form a plug connector system consisting of a connector to be mounted on a printed circuit board and a mating connector that can be inserted into this connector, which connectors, as a result of the design according to the disclosure of the shield plates, allow interference currents to be reliably dissipated.

BRIEF DESCRIPTION OF THE DRAWINGS

The invention is described in greater detail below using drawings illustrating embodiments, in which, schematically:

FIG. 1A to 1E show a plug connector 2 comprising a housing 4.

DETAILED DESCRIPTION

Figure 1A:
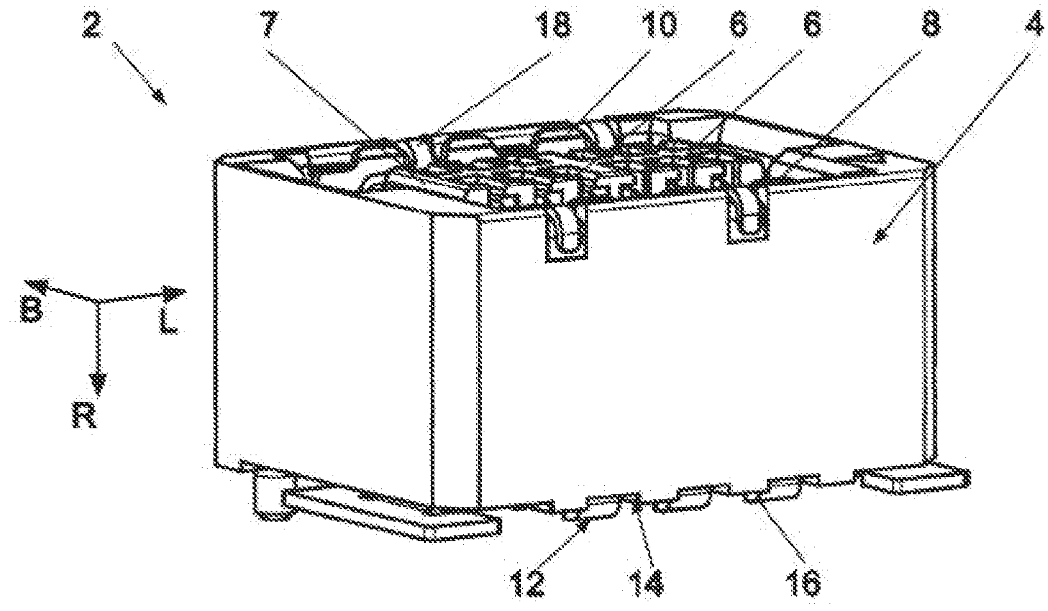
FIG. 1A shows a plug connector according to the disclosure in a perspective view from above.

The plug connector 2 comprises a plurality of receptacles 6 formed on the housing 4, each of which is provided for securing a contact (not shown) which is designed to contact a contact of a further plug connector. The receptacles 6 are 20 arranged in a grid-like manner on an inner web 7 (an inner web) of the housing 4.

The plug connector 2 comprises two shield plates 8, 10 which are designed to shield contacts to be arranged in the receptacles 6.

Figure 1B:
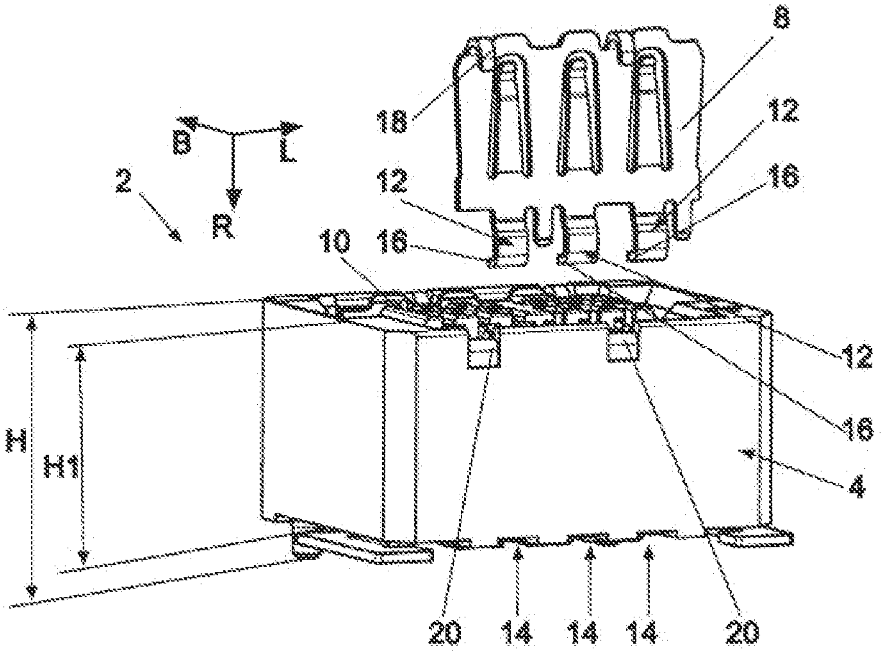
FIG. 1B shows the plug connector from FIG. 1A with a disassembled shield plate.
Figure 1C:
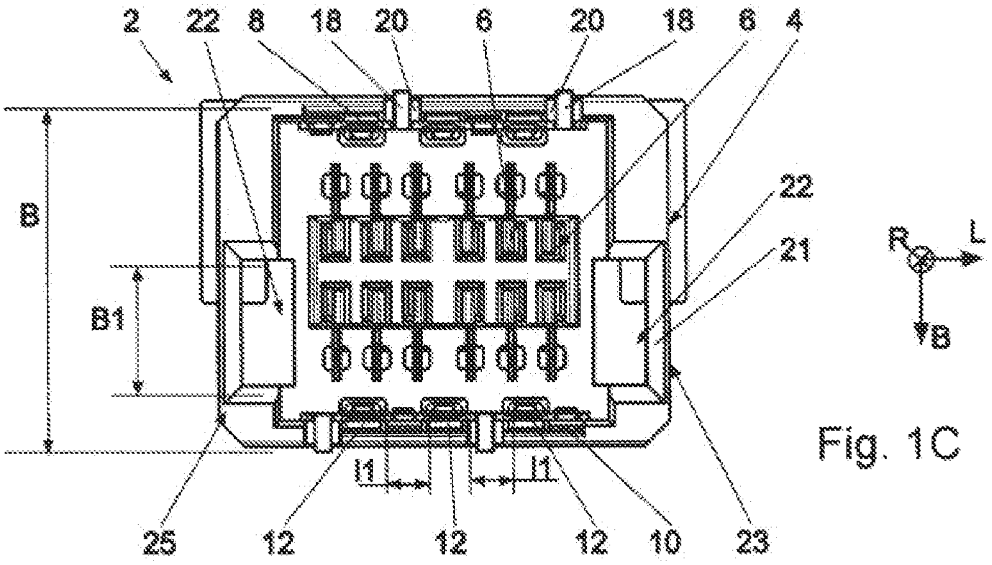
FIG. 1C shows the plug connector from FIG. 1A in a plan view.
Figure 1D:
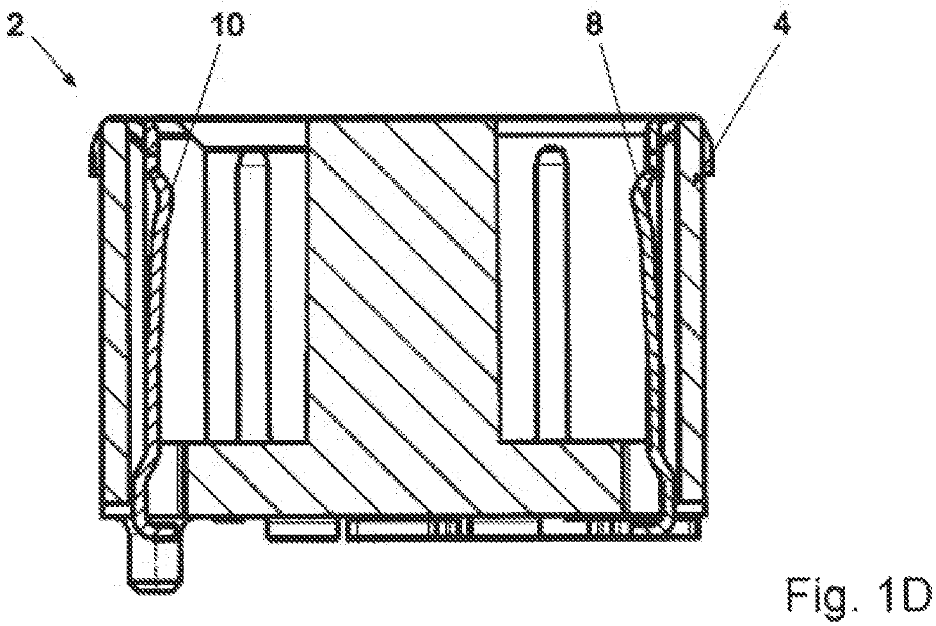
FIG. 1D shows the plug connector from FIG. 1A in a sectional view.
Figure 1E:
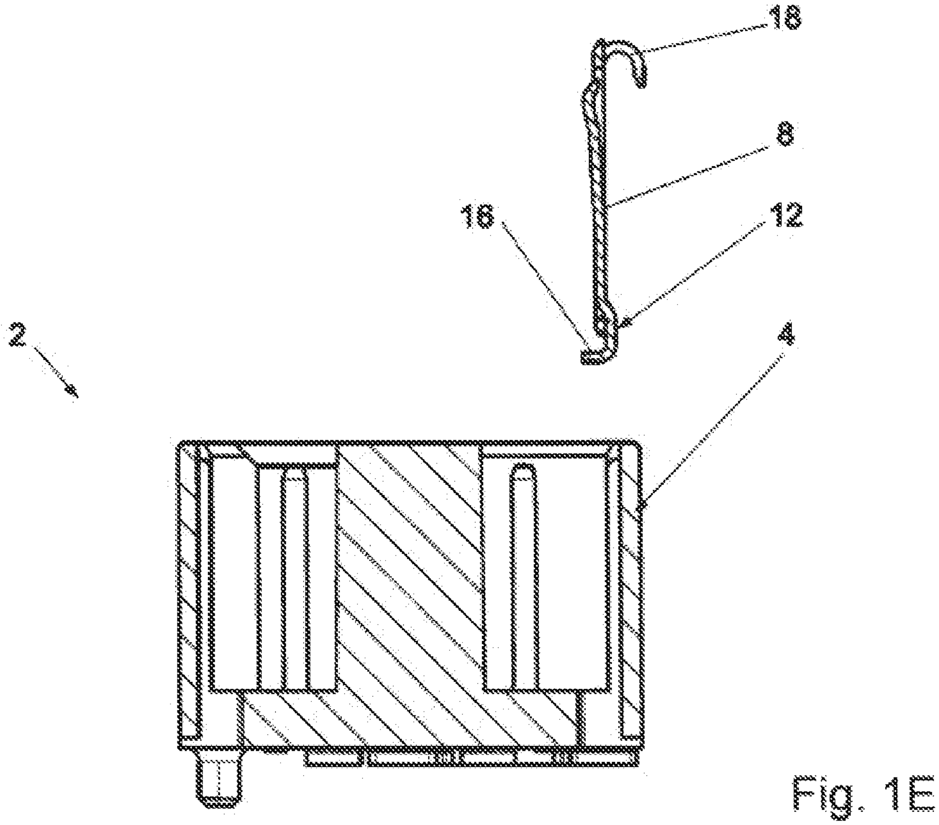
FIG. 1E shows the plug connector from FIG. 1A in a sectional view with a disassembled shield plate.
Figure 2A:
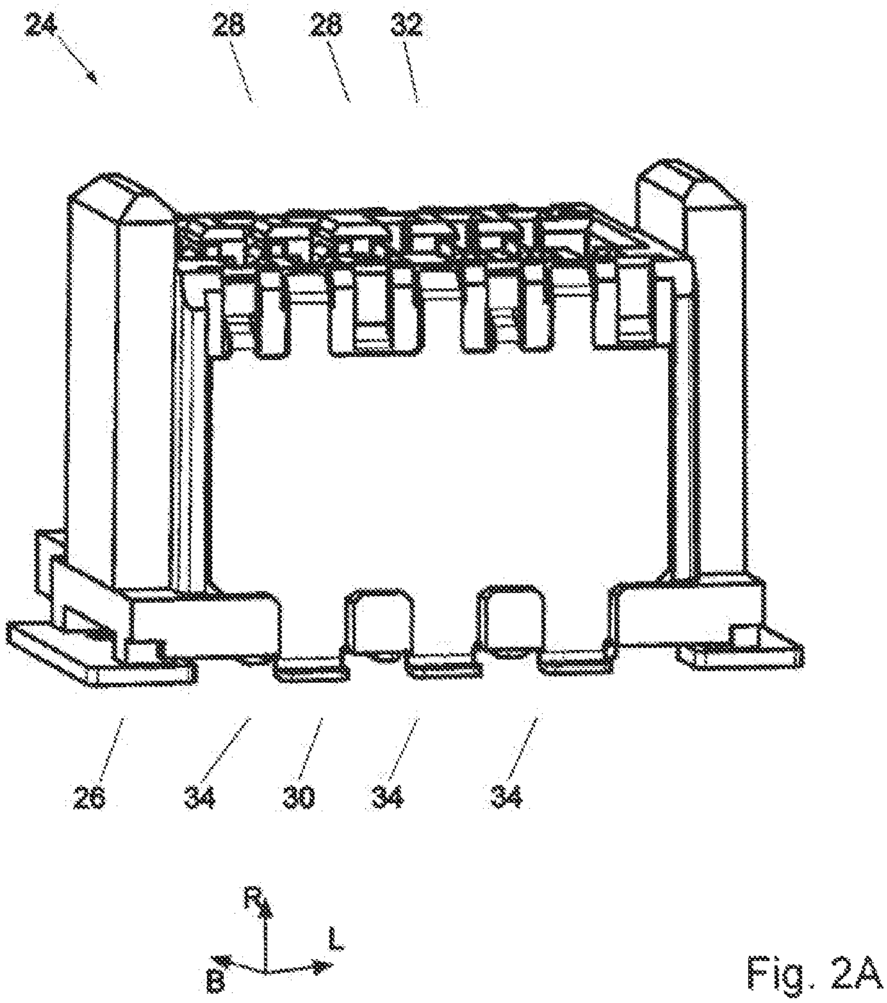
FIG. 2A shows a further plug connector according to the disclosure in a perspective view from above.
Figure 2B:
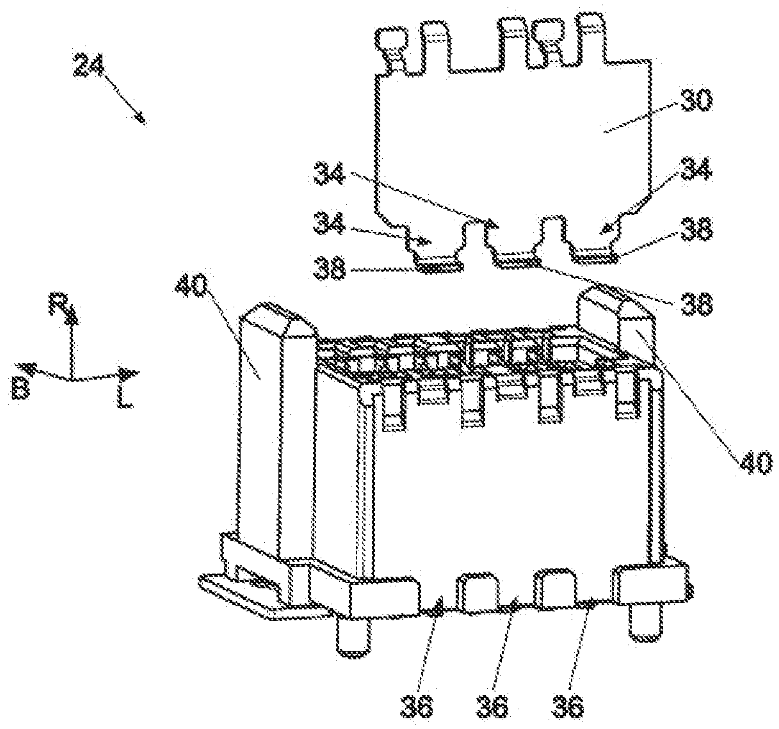
FIG. 2B shows the plug connector from FIG. 2A with a disassembled shield plate.
Figure 2C:
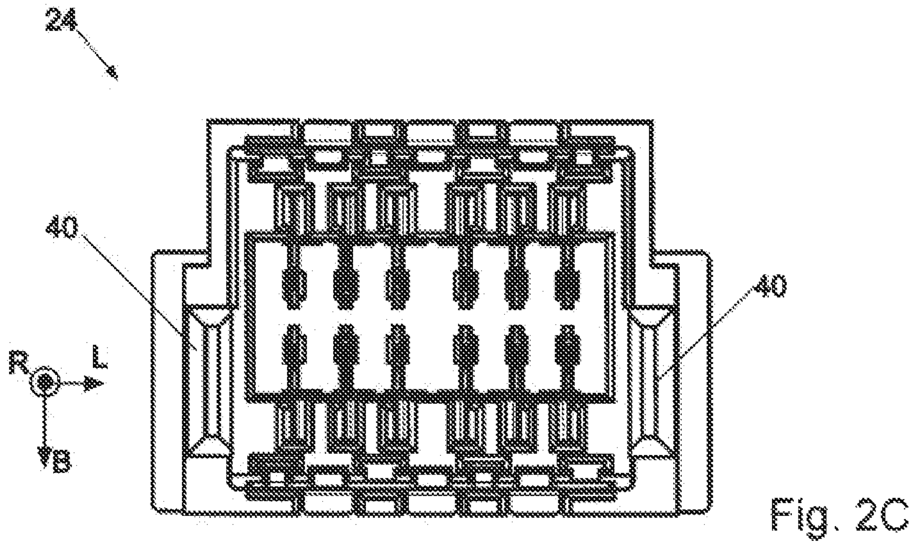
FIG. 2C shows the plug connector from FIG. 2A in a plan view.
Figure 2D:
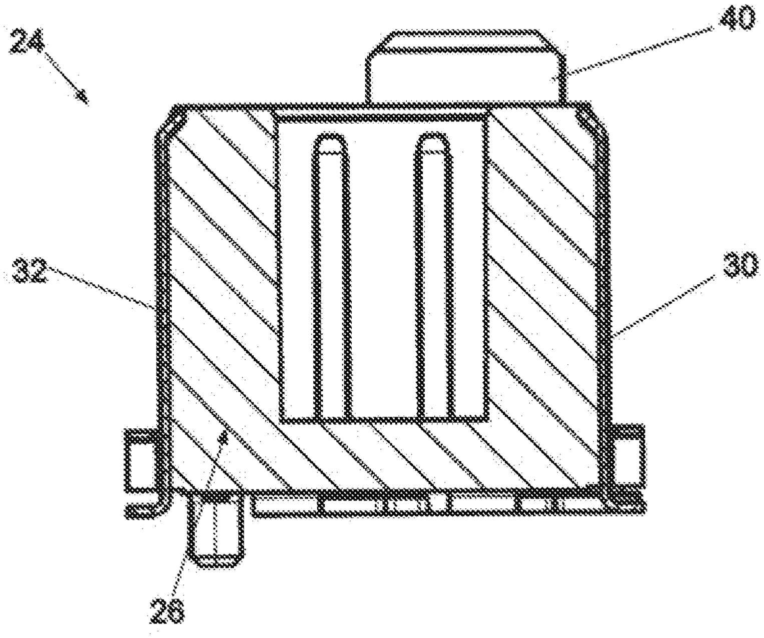
FIG. 2D shows the plug connector from FIG. 2A in a sectional view.
Figure 2E:
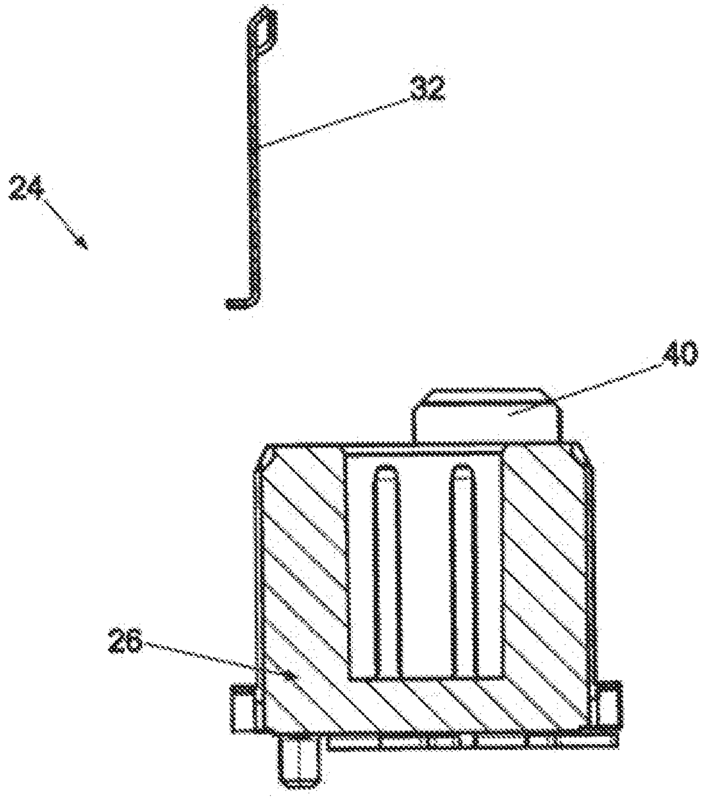
FIG. 2E shows the plug connector from FIG. 2A in a sectional view with a disassembled shield plate.

In order to illustrate the geometry of the shield plates 8, 10, the shield plate 8 is shown separately in FIGS. 1B and 1E, in each case in a state in which it is disassembled from the housing 4. The shield plates 8, 10 are identical, and therefore the structural design or the shape of the shield plates 8, 10 is described below using the shield plate 8 by way of example.

The shield plate 8 comprises three protruding soldering portions 12. In the assembled state, each of the soldering portions 12 passes through a housing opening 14 in the housing 4. Therefore, in the present case, three through-openings 14 for the soldering portions 12 of the shield plate 8 are provided on the housing 4 and three further through-openings 14 are provided for the soldering portions 12 of the shield plate 10 to be inserted through.

Each of the soldering portions 12 has a free end portion 16, which in the present case is bent in the direction of the receptacles 6 or the inner web 7.

In the present case, the soldering portions 12 are arranged so as to be distributed equidistantly and thus, viewed in a direction L measured transversely to an insertion direction R, have constant spacings 11 from one another (FIG. 1C).

In the present case, the shield plates 8, 10 consist of a single metal alloy and are not coated.

The shield plates 8, 10 each comprise latching hooks 18 by means of which the shield plates 8, 10 each form-fittingly engage in shaped elements 20 of the housing 4.

The plug connector 2 comprises two guide elements 22 which are designed to form-fittingly guide and position the plug connector 2 on a further plug connector or relative to a further plug connector, the guide elements 22 being spaced apart from the shield plates 8, 10.

In the present case, the guide elements 22 are formed as grooves 22 embedded in a lateral wall of the housing 4. The guide elements 20 are thus an integral part of an outer wall 21 of the housing 4, the outer wall circumferentially enclosing the receptacles 6.

The guide elements 22 are formed on opposite wall portions 23, 25 of the housing 4.

The guide elements 22, viewed along the insertion direction R, have a height H1 which is more than half the total height H of the housing 4. Furthermore, the guide elements 22 each have a width B1 which is measured perpendicularly to the insertion direction R of the further plug connector into the plug connector 2 and which is more than a quarter of the total width B of the housing 4.

FIG. 2A to 2E show a further variant of a plug connector 24 according to the disclosure, the plug connector 24 in the present case forming a mating connector 24 to the plug connector 2 that can be plugged into the plug connector 2.

The plug connector 24 comprises a housing 26 and a plurality of receptacles 28 formed on the housing 26. The receptacles 28 are each provided for securing a contact (not shown) which is designed to contact a contact arranged in a relevant receptacle 6 of the plug connector 2.

The plug connector 24 comprises two shield plates 30, 32 which are held on the housing 4 in order to shield the contacts.

The shield plates 30, 32 each comprise freely protruding soldering portions 34 which each pass through a housing opening 36. Each of the soldering portions 36 has a free end portion 38 which is bent away from the receptacles 28. In the present case, three soldering portions 34 are thus formed on each shield plate 30, 32.

The shield plates 30, 32 consist of a single alloy and are not coated.

The housing 26 of the plug connector 28 comprises guide elements 40 which, in the present case, are formed as projections 40 which are designed to be introduced into the guide elements 22 of the plug connector 2 and form a linear guide with the guide elements 22 of the plug connector 2, such that the plug connector 24 can be introduced into the plug connector 2 rectilinearly along the insertion direction R.

The dimensions of the projections 40 substantially correspond to the dimensions of the openings or grooves 22, the projections 40 being dimensioned such that they can be introduced into the openings 22 or grooves 22.

LIST OF REFERENCE SIGNS

2 Plug connector
4 Housing
6 Receptacle
7 Web
8 Shield plates
10 Shield plates
12 Soldering portion
14 Housing opening/through-opening
16 End portion
18 Latching hook
20 Shaped element
22 Guide element
21 Outer wall
23 Wall portion
25 Wall portion
24 Plug connector
26 Housing
28 Receptacle
30 Shield plate
32 Shield plate
34 Soldering portion
36 Housing opening
38 End portion
40 Projection
R Insertion direction
L Direction
11 Spacing
H1 Height
H Total height
B1 Width
B Total width

The invention claimed is:

1. A plug connector comprising:
a housing including:
an inner web, and
a plurality of receptacles formed in a grid on the inner web for securing a contact which is designed to contact a contact of an additional plug connector; and
at least one shield plate including three soldering portions which pass through respective openings in the housing, a free end portion of each of the three soldering portions being bent away from the plurality of receptacles or being bent in a direction of the plurality of receptacles,
wherein the housing further includes at least two guide elements to form-fittingly guide and position the plug connector on the additional plug connector, the at least two guide elements being spaced apart from the at least one shield plate,
wherein mechanical alignment of the plug connector with the additional plug connector is formed by different dimensioning of the at least two guide elements of the plug connector, and
wherein each receptacle of the plurality of receptacles is in the inner web and is formed, respectively, as a recess that is circumferentially enclosed by the inner web.

2. The plug connector according to claim 1, wherein:
the three soldering portions are arranged so as to be distributed equidistantly.

3. The plug connector according to claim 1, wherein:
the at least one shield plate consists of a single alloy and is uncoated.

4. The plug connector according to claim 1, wherein:
the at least one shield plate comprises at least one latching hook via which the at least one shield plate is held on the housing.

5. The plug connector according to claim 4, wherein:
the at least one latching hook form-fittingly engages in a shaped element formed on the housing.

6. The plug connector according to claim 1, wherein:
the at least two guide elements are projections or mandrels to form-fittingly engage in respective complementarily shaped guide elements of the additional plug connector, or
the at least two guide elements are grooves or recesses to form-fittingly receive respective complementarily shaped guide elements of the additional plug connector.

7. The plug connector according to claim 1, wherein:
the at least two guide elements are respective integral parts of an outer wall of the housing, the outer wall circumferentially enclosing the plurality of receptacles.

8. The plug connector according to claim 1, wherein:
the at least two guide elements include a first guide element and a second guide element,
the first guide element is formed on a first wall portion of the housing,
the second guide element is formed on a second wall portion of the housing, and
the first wall portion and the second wall portion are spaced apart from one another and arranged on opposite housing sides.

9. The plug connector according to claim 1, wherein:
the at least two guide elements have a height (H1), respectively, which is measured along an insertion direction (R) of the additional plug connector into the plug connector and which is more than half of a total height (H) of the housing, and/or
the at least two guide elements have a width (B1), respectively, which is measured perpendicularly to an insertion direction (R) of the additional plug connector into the plug connector and which is more than a quarter of a total width (B) of the housing.

* * * * *